(12) United States Patent
Nezami et al.

(10) Patent No.: US 11,953,002 B2
(45) Date of Patent: Apr. 9, 2024

(54) SCROLL COMPRESSOR FOR COMPRESSING A REFRIGERANT AND METHOD FOR OIL ENRICHMENT AND DISTRIBUTION

(71) Applicant: Hanon Systems, Daejeon (KR)

(72) Inventors: Iman Nezami, Remscheid (DE); Laura Arriazu, Pulheim (DE); Thomas Klotten, Cologne (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 17/756,729

(22) PCT Filed: Jun. 30, 2021

(86) PCT No.: PCT/KR2021/008299
§ 371 (c)(1),
(2) Date: Jun. 1, 2022

(87) PCT Pub. No.: WO2022/005212
PCT Pub. Date: Jan. 6, 2022

(65) Prior Publication Data
US 2023/0113626 A1    Apr. 13, 2023

(30) Foreign Application Priority Data
Jul. 1, 2020   (DE) ...................... 10 2020 117 373.3

(51) Int. Cl.
*F04C 18/02* (2006.01)
*F04C 27/00* (2006.01)
(Continued)

(52) U.S. Cl.
CPC .......... *F04C 18/0215* (2013.01); *F04C 27/00* (2013.01); *F04C 29/0021* (2013.01);
(Continued)

(58) Field of Classification Search
CPC .. F16C 33/7846; F16C 33/785; F16C 33/664; F16C 33/6655
See application file for complete search history.

(56) References Cited

U.S. PATENT DOCUMENTS 2,237,616 A * 4/1941 Smith ................. F16C 33/7846
277/411
2,655,393 A * 10/1953 Cobb .................. F16C 33/7856
277/423
(Continued)

FOREIGN PATENT DOCUMENTS

CN      105840504 A *  8/2016 .......... F04C 18/0215
DE   102017104320 A1 *  9/2018
(Continued)

OTHER PUBLICATIONS

DE-102017104320-A1, English Language Machine Translation (Year: 2018).*

*Primary Examiner* — Wesley G Harris
(74) *Attorney, Agent, or Firm* — Shumaker, Loop & Kendrick, LLP; James D. Miller

(57) ABSTRACT

A scroll compressor and a method for oil enrichment and distribution, wherein the scroll compressor includes a compressor housing, two scrolls, a respective base plate, an eccentric drive, a drive shaft, an axis of rotation, a balance weight, a first bearing, a second bearing, and a counter-pressure space, and wherein a sealing washer is fixed on the first bearing at a side of the first bearing directed to the cavity of the rotatable balance weight and of the second bearing such that the sealing washer seals the first bearing on one side in a radially outer part of a region between an inner ring and an outer ring through which fluid can flow and is, at the same time, spaced from the inner ring in a radial manner such that a gap through which fluid can flow remains.

10 Claims, 3 Drawing Sheets

(51) Int. Cl.
  *F04C 29/00*  (2006.01)
  *F04C 29/02*  (2006.01)
  *F16C 33/78*  (2006.01)

(52) U.S. Cl.
  CPC .......... *F04C 29/026* (2013.01); *F04C 29/028* (2013.01); *F16C 33/7846* (2013.01); *F16C 33/785* (2013.01); *F04C 2240/50* (2013.01); *F04C 2240/807* (2013.01)

(56) References Cited

U.S. PATENT DOCUMENTS

| | | | | |
|---|---|---|---|---|
| 3,350,148 | A | * | 10/1967 | Sanguinetti ......... F16C 33/7846 384/488 |
| 4,655,617 | A | * | 4/1987 | Yasui ................. F16C 33/6603 384/488 |
| 5,433,533 | A | * | 7/1995 | Imazaike ................ F16C 33/80 384/488 |
| 2007/0103015 | A1 | * | 5/2007 | Koide .................... F01C 21/10 310/71 |
| 2017/0002816 | A1 | | 1/2017 | Uekawa |
| 2017/0292517 | A1 | * | 10/2017 | Lee .................... F04C 18/0215 |
| 2018/0231002 | A1 | | 8/2018 | Lee |
| 2018/0347568 | A1 | * | 12/2018 | Moon ................ F04C 18/0246 |
| 2020/0032795 | A1 | | 1/2020 | Kim et al. |
| 2020/0080547 | A1 | | 3/2020 | Cho et al. |

FOREIGN PATENT DOCUMENTS

| | | | | |
|---|---|---|---|---|
| EP | 264264 | A * | 4/1988 | ............ F16C 19/163 |
| EP | 2500517 | A2 * | 9/2012 | ............. F01C 21/10 |
| GB | 2529654 | A * | 3/2016 | ............ F16C 33/583 |
| JP | 10131973 | A * | 5/1998 | ............ F16C 33/783 |
| JP | 11173338 | A * | 6/1999 | ........... F16C 33/7846 |
| JP | 11257363 | A * | 9/1999 | ............ F16C 33/664 |
| JP | 2002115724 | A * | 4/2002 | ............ F16C 33/782 |
| JP | 2002310172 | A * | 10/2002 | ........... F16C 33/7826 |
| JP | 2006329141 | A | 12/2006 | |
| JP | 2012141064 | A | 7/2012 | |
| JP | 2013241853 | A | 12/2013 | |
| KR | 101912695 | B1 | 10/2018 | |
| KR | 20200009276 | A | 1/2020 | |
| WO | WO-2014118855 | A1 * | 8/2014 | ........... F04B 39/0066 |
| WO | WO-2018117682 | A1 * | 6/2018 | ............. F04B 39/16 |
| WO | WO-2018151512 | A1 * | 8/2018 | ............. F04C 18/02 |

* cited by examiner

SCROLL COMPRESSOR FOR COMPRESSING A REFRIGERANT AND METHOD FOR OIL ENRICHMENT AND DISTRIBUTION

CROSS REFERENCE TO RELATED APPLICATIONS

This is a U.S. national phase patent application of PCT/KR2021/008299 filed Jun. 30, 2021 which claims the benefit of and priority to German Pat. Appl. No. 10 2020 117 373.3 filed on Jul. 1, 2020, the entire contents of each of which are incorporated herein by reference.

TECHNICAL FIELD

The invention relates to a scroll compressor for compressing a refrigerant. The design of this scroll compressor enables an improved oil enrichment and distribution system for the lubrication of bearings and friction-stressed components within the scroll compressor. The invention thus also relates to a method for oil enrichment and distribution in such a scroll compressor. The invention can be applied in the field of electrical refrigerant compressors for the air conditioning of motor vehicles.

BACKGROUND ART

A scroll compressor has a compressor housing and two scrolls nested within the compressor housing with a respective base plate and a scroll-shaped wall extending from a front of the base plate. Of the two nested scrolls, one scroll is stationary and the other scroll can be moved in an eccentric manner on a circular path, wherein this movable scroll is also referred to as orbitating scroll. The movement of this scroll changes the volume of compression chambers formed between the scrolls in a cyclical manner, wherein refrigerant is drawn in and compressed. The movable scroll is moved by means of an eccentric drive on a circular path. The eccentric drive is formed by a drive shaft which rotates about an axis of rotation and a balance weight rotating with the drive shaft. The movable scroll is connected to the drive shaft in an eccentric manner via the balance weight, i. e. the axis of the movable scroll and the axis of the drive shaft are arranged offset from one another. The drive shaft is supported on the compressor housing via a first bearing, in particular a ball bearing, also referred to as main bearing, while the movable scroll is supported on the balance weight via a second bearing, which is also referred to as orbitating bearing. Within the compressor housing, on the back of the base plate of the movable scroll, a so-called counter-pressure space is formed, wherein this counter-pressure space, which is also referred to as counter-pressure chamber, is subjected to a pressure whose value is smaller than the outlet pressure (high pressure), but larger than the suction pressure (low pressure) of the substantially gaseous fluid to be compressed. This counter-pressure serves for pressing the movable scroll against the stationary scroll.

Furthermore, the scroll compressor usually has a guiding device which prevents a rotation of the movable scroll and enables the circulation of the movable scroll. The guiding device is formed with a plurality of pocket-shaped receipts, usually with respective circular openings, on the back of the base plate of the movable scroll. These receipts, which are also referred to as orbitating pocket, are arranged in specific distances to one another and can, for example, be formed as blind holes. Furthermore, the guiding device has pins which are formed protruding out of a wall of the compressor housing and respectively engage one of the pocket-shaped receipts formed in the base plate of the movable scroll. Thus, a first end of the pins can protrude out of a wall of the compressor housing, while a second end protrudes into this wall.

Due to the geometric design of the scroll compressor, there is a large number of friction-stressed components in the counter-pressure space. Thus, the scroll compressor has, apart from the first bearing as main bearing and the second bearing as orbitating bearing, further circumferential, friction-stressed components which all require sufficient lubrication especially during high speed operation. Not only an overall amount of oil in the counter-pressure region is relevant for the correct lubrication, but the distribution of the oil is important as well. In particular the lubrication of the second, orbitating bearing, which moves in an eccentric manner and at the same time rotates about its own axis, is a large challenge. However, a sufficient lubrication of the second bearing is absolutely necessary in order to prevent fatiguing of the bearing.

From the state of the art, a relatively complex, active oil return is known, for example, which supplies the oil circulating in the circuit to the surrounding installation space of the second, orbitating bearing.

One possibility to balance a minor lubrication of the second bearing and of the surrounding friction-stressed components consists in filling the cavity of the rotating balance weight with oil. However, the complete filling of the cavity of the rotating balance weight with oil causes an increase of the required drive power for the operation of the compressor, as in this case, the balance weight has to overcome the flow resistance of the liquid oil phase instead of the gas phase of the refrigerant.

The functionality of the scroll compressor requires a return of mainly gaseous refrigerant. In doing so, a passive lubrication of the second, orbitating bearing and of the surrounding friction-stressed components through oil parts in the refrigerant flow is known as well. The rotational movement of the shaft and of the balance weight throws the essential oil required for the lubrication of the orbitating bearing and of the surrounding friction-stressed components off to the outside. In doing so, the orbitating ball bearing and surrounding friction-stressed components are in an inner area which is not flowed through by the mixture of refrigerant gas and oil. The flow guidance can lead to the oil mist not flowing through the second, orbitating ball bearing or the surrounding friction-stressed components and thus not sufficiently providing them with lubrication. Thus, the supply of oil to the orbitating bearing cannot be guaranteed for all operating states, in particular not for the operation at high speeds.

SUMMARY

The object the invention is based on consists in an improved lubrication of the second, orbitating bearing and of the surrounding friction-stressed components.

This object of the invention is solved by a scroll compressor for the compression of a refrigerant with the features shown and described herein. Such a scroll compressor enables a system or a method of oil enrichment and distribution, wherein a corresponding system is in particular suited for electrical air conditioning compressors.

The scroll compressor according to the invention comprises a compressor housing and two scrolls nested within the compressor housing with a respective base plate and a scroll-shaped wall extending from a front of the base plate. One scroll is stationary and the other scroll is movable on a circular path in an eccentric manner. By moving the scroll, the volume of compression chambers formed between the scrolls can be changed in a cyclical manner, whereby refrigerant can be drawn in and compressed. Furthermore, the scroll compressor comprises an eccentric drive by means of which the scroll can be moved on a circular path, which in turn comprises a drive shaft rotatable about an axis of rotation and a balance weight rotatable with the drive shaft and via which the movable scroll is connected to the drive shaft in an eccentric manner.

The scroll compressor comprises a first bearing via which the drive shaft is supported on the compressor housing, and a second bearing via which the movable scroll is supported on the balance weight. Furthermore, the scroll compressor comprises a counter-balance space within the compressor housing on the back of the base plate of the movable scroll in which a cavity of the rotatable balance weight and of the second bearing is formed. According to the invention, a sealing washer, which, on the first bearing, is fixed to the first bearing, on a side of the first bearing directed to the cavity of the rotatable balance weight and to the second bearing such that the sealing washer seals one side of the first bearing in a radially outer, i. e. in an outer part of a region between an outer ring and an inner ring of the first bearing through which fluid can flow, in the radial direction with regard to the axis of rotation, and at the same time is radially spaced from the inner ring, such that a gap through which fluid can flow remains.

According to an advantageous embodiment of the invention, the sealing washer is fixed to the outer ring of the first bearing, preferably via a clamping connection.

A particularly preferred embodiment is that both the sealing washer and the gap are formed in a ring-shaped manner. This variant is advantageous for all embodiments which correspond to the normal case that the first bearing is a rolling bearing, in particular a ball bearing, with the outer ring and the inner ring of the first bearing and rolling elements distributed therebetween over the entire circumference. An advantageous development of the invention consists in that a circumferential groove for the fixation of the sealing washer is formed for the receipt of the sealing washer on the inner wall of the outer ring of the first bearing.

Usually, the second bearing is a rolling bearing as well, preferably a ball bearing, with an outer ring and an inner ring and rolling elements distributed therebetween over the entire circumference.

A further aspect of the invention relates to a method for oil enrichment and distribution for the lubrication of bearings and friction-stressed components of the above-stated scroll compressor according to the invention. During the operation of the scroll compressor, a fluid mixture of refrigerant gas and oil is introduced into the counterpressure space.

Oil, which separates from the fluid mixture due to a centrifugal force which occurs in a rotating flow of the mixture of refrigerant gas and oil caused by the rotating balance weight, is enriched by means of the sealing washer acting as a barrier up to the setting of an oil level in the cavity of the balance weight and of the second bearing which is sufficient for the lubrication of the second, orbiting bearing.

The core of the solution according to the invention consists in the first bearing which is partially sealed on one side by means of the sealing washer, also referred to as main bearing, wherein a radial gap to the inner ring of the first bearing remains opened. This adaptation of the geometric design of the cavity of the balance weight and thus of the counter-pressure space as well leads to an enrichment of oil within this cavity and guarantees a sufficient distribution of the oil without causing losses through splashing. As the rotating flow in the cavity of the balance weight caused by the rotating balanced weight separates the oil from the multiphase mixture of the control mass flow out of the valve, a specific radial oil level is caused which is determined by measures of the sealing washer, for example by the inner diameter of a sealing washer when it is, as preferred, embodied in a ring-shaped manner. In this case, the oil can be caused to enrich itself until the oil level which corresponds to the inner diameter of the ring-shaped sealing washer is reached. Thus, a ring-shaped sealing washer with an inner diameter can be used which corresponds to a setting radial oil level due to the barrier effect of the sealing washer, whose horizontally oriented plane lies between a radial outer ring of the second bearing and an inner ring of the second bearing. An embodiment in which the sealing washer is used with an inner diameter which corresponds to a radial oil level which corresponds to a radial oil level setting as a result of the barrier effect of the sealing washer, whose horizontally oriented plane lies closer to the inner ring than to the outer ring of the second bearing, is particularly preferred.

A major advantage of the invention consists in a significant increase of the fatigue strength of the friction-stressed components due to the larger and better distributed lubrication. The scroll compressor according to the invention with the improved system for the enrichment and distribution of oil for the lubrication of the bearings and of other friction-stressed components has a longer life, is quieter, less prone to wear and tear and more efficient. A significantly smaller power loss than with systems for the supply of oil or the return of oil for the lubrication of bearings and friction-stressed components in scroll compressors known up to now can be recorded. The invention also enables a reduction of the complete amount of oil and thus provides a cost-efficient solution.

BRIEF DESCRIPTION OF DRAWINGS

Further details, features and advantages of embodiments of the invention result from the following description of example embodiments with reference to the related drawings.

The following is shown.

DESCRIPTION OF AN EMBODIMENT

Figure 1:
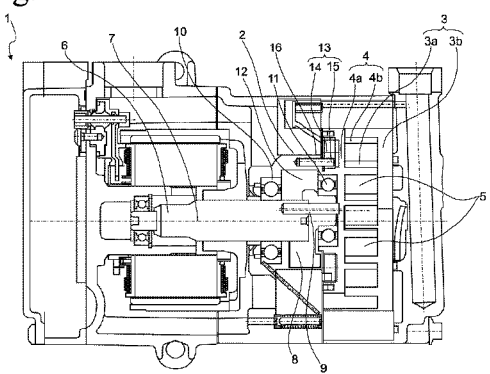
FIG. 1: a longitudinal sectional view of a scroll compressor.

FIG. 1 shows a longitudinal sectional representation of a scroll compressor 1 for the compression of a refrigerant. FIG. 1 shows the geometric design of the scroll compressor 1 and primarily serves for the illustration of the invention, without, however, showing all features of the invention. The scroll compressor 1 has a compressor housing 2 and two scrolls 3, 4 nested within the compressor housing 2 with a respective base plate 3a; 4a and a scroll-shaped wall 3b; 4b extending from a front of the base plate 3a; 4a. Of the two nested scrolls 3; 4, one scroll 3 is stationary and the other scroll 4 can be moved in an eccentric manner on a circular path, wherein this movable scroll 4 is also referred to as orbitating scroll 4. The movement of the scroll 4 changes the volume of compression chambers 5 formed between the scrolls 3, 4 in a cyclical manner, wherein refrigerant is drawn in and compressed. The movable scroll 4 is moved by means of an eccentric drive on a circular path. The eccentric drive is formed by a drive shaft 6 which rotates about an axis of rotation 7 and a balance weight 8 rotating with the drive shaft. The movable scroll 4 is connected to the drive shaft 6 in an eccentric manner via the balance weight 8, i. e. the axis 9 of the movable scroll 4 and the axis 7 of the drive shaft 6 are arranged offset from one another. The drive shaft 6 is supported on the compressor housing 2 via a first bearing 10, in particular a ball bearing 10, also referred to as main bearing, while the movable scroll 4 is supported on the balance weight 8 via a second bearing 11, which is also referred to as orbitating bearing 11. Within the compressor housing 2, on the back of the base plate 4a of the movable scroll 4, a so-called counter-pressure space 12 is formed, wherein this counter-pressure space 12, which is also referred to as counterpressure chamber, is subjected to a pressure whose value is smaller than the outlet pressure (high pressure), but larger than the suction pressure (low pressure) of the substantially gaseous fluid to be compressed. This counter-pressure serves for pressing the movable scroll 4 against the stationary scroll 3.

The scroll compressor 1 further has a guiding device 13 which prevents a rotation of the orbitating scroll 4 and enables the circulation of the movable scroll 4. The guiding device 13 is formed with a plurality of pocket-shaped receipts 14, usually with respective circular openings, on the back of the base plate 4a of the movable scroll 4. These receipts 14, which are also referred to as orbitating pocket, are arranged in specific distances to one another and can, for example, be formed as blind holes. Furthermore, the guiding device 13 has pins 15 which are formed protruding out of a wall 16 of the compressor housing 2 and respectively engage one of the pocket-shaped receipts 14 formed in the base plate 4a of the movable scroll 4. Thus, a first end of the pins 15 can protrude out of the wall 16 of the compressor housing 2, while a second end protrudes into this wall 16.

Due to the geometric design of the scroll compressor 1, there is a large number of friction-stressed components in the counter-pressure space 12. Thus, the scroll compressor 1 has, apart from the first bearing 10 as main bearing and the second bearing 11 as orbitating bearing, further circumferential, friction-stressed components, such as the pocket-shaped receipts 14, which all require sufficient lubrication especially during high speed operation. Not only an overall amount of oil in the counterpressure region 12 is relevant for the correct lubrication, but the distribution of the oil is important as well. In particular the lubrication of the second, orbitating bearing 11, which moves in an eccentric manner and at the same time rotates about its own axis 9, is a large challenge. However, a sufficient lubrication of the orbitating bearing 11 is absolutely necessary in order to prevent fatiguing of the bearing 11.

Figure 2:
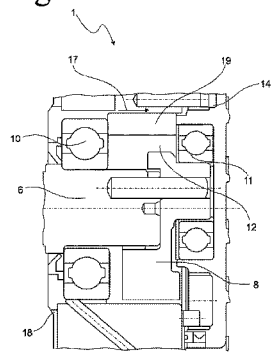
FIG. 2: a detailed view with the representation of the control mass flow and the oil deposition in the counter-pressure space of the scroll compressor.

FIG. 2 shows a detailed view with a schematic representation of the refrigerant flow and an oil deposition in the counter-pressure space 12 of the scroll compressor 1 shown before in FIG. 1 without the application of the substantial features according to the invention.

The functionality of the scroll compressor 1 requires a return of mainly gaseous refrigerant. In doing so, a passive lubrication of the second bearing 11, which in this case is a ball bearing 11, and of the surrounding friction-stressed components through oil parts in the refrigerant flow is known as well. The rotational movement of the drive shaft 6 and of the balance weight 8 throws the essential oil required for the lubrication of the second, orbitating ball bearing 11 and of the surrounding friction-stressed components off to the outside. In doing so, the second ball bearing 11 and surrounding friction-stressed components are in an inner area which is not flowed through by the mixture of refrigerant gas and oil. The flow guidance can lead to the oil mist not flowing through the second ball bearing 11 or the surrounding friction-stressed components and thus not sufficiently providing them with lubrication. The supply of oil to the second ball bearing 11 cannot be guaranteed for all operating states, in particular not for the operation at high speeds.

According to the representations in FIG. 2, first, a multiphase mixture of a control mass flow 17 consisting of refrigerant gas and oil is guided into the orbitating pocket 14. The refrigerant gas flow, which is still present as a high-pressure flow before the entry into the counter-pressure space 12, contains a low mass fraction of oil and enters the counter pressure space 12 through a counter-pressure valve, wherein the pressure of the mixture of refrigerant gas and oil is reduced to a lower pressure level, the counter-pressure. The mixture of the control mass flow 17 exits the counter-pressure space 12 through the first bearing 10 in the direction of the low-pressure side 18. Thus, a sufficient lubrication of the first bearing 10 is guaranteed. The counter-pressure space 12 is constantly flowed through in the process. In case of a constant drive, the complete mixture of refrigerant gas and oil, which enters the counter-pressure space 12, is guided out of the counterpressure space 12 by the first bearing 10.

After the mixture of refrigerant gas and oil of the control mass flow 17 enters the orbitating pocket 14, the oil 19 separates from the multiphase mixture of the control mass flow 17 due to the centrifugal force which acts in a rotating flow caused by the rotating balance weight 8.

Figure 3:
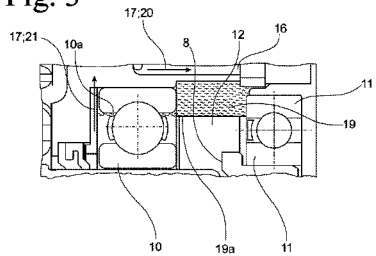
FIG. 3: a further detailed view with the representation of the control mass flow and the oil deposition in the counter-pressure space of the scroll compressor.

FIG. 3 illustrates, in a further detailed view, the depositing effect of the rotating flow, wherein the main features of the invention are not in use. The counter-pressure space 12, in particular the cavity of the second bearing 11 and of the rotating balance weight 8, is flowed through by a mixture of gaseous refrigerant and oil. The fluid inlet 20 into the counter-pressure space 12 is represented in FIG. 3 by the first arrow, the fluid outlet 21 out of the counter-pressure space 12 is represented by a second arrow. A rotating flow sets in the cavity of the second bearing 11 and of the rotating balance weight 8. This flow leads to the deposition of the oil phase 19 out of the control mass flow 17 used for the setting of the working pressure, which is schematically shown in FIG. 3. The refrigerant and the oil pass through the first bearing 10 and then exit the cavity. Thus, an oil layer 19 forms on the outer diameter of the counter-pressure space 12. The thickness of this oil layer 19 is influenced by the inner diameter of the outer ring 10a of the first bearing 10. The low oil level 19a of the oil collected due to the separation from the mixture of refrigerant gas and oil, wherein the separation is the result of a centrifugal force which occurs in a rotating flow caused by the rotation balance weight 8, is thus sufficient in order to fill the counter-pressure space 12 with oil 19 in a horizontally oriented plane such that the outer ring 10a of the first bearing 10 is covered with oil, such that at least a sufficient lubrication of the first bearing 10 is guaranteed. However, this oil level 19a is far from being high enough in order to reach the second, orbitating bearing 11 and guarantee lubrication there as well. This is because the oil 19 can only be enriched as long as its level reaches the lowest downstream diameter, which corresponds to the inner diameter of the outer ring 10a of the first bearing 10. A further enrichment of oil 19 in the counterpressure space cannot be achieved in this manner.

Figure 4:
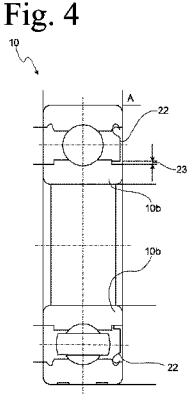
FIG. 4: a sectional representation of the first bearing with a sealing washer applied to one side.

FIG. 4 shows a sectional representation of the first bearing 10 with a sealing washer 22 applied to one side which seals the radially outer part of the region of the first bearing through which fluid can flow and which is enclosed by the outer ring 10a. The sealing washer 22 is fixed to the outer ring 10a of the first bearing 10 and is spaced from the inner ring 10b of the first bearing 10 in a radial manner such that a ring gap 23 between the sealing washer 22 and the inner ring 10b remains uncovered and thus the fluid mixture of refrigerant gas and oil can still flow through it.

Figure 5:
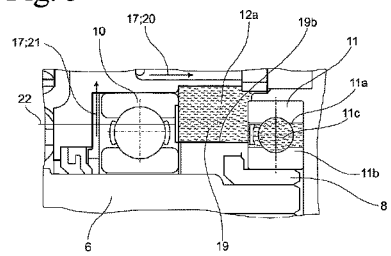
FIG. 5: a schematic representation of the enrichment of oil from the mixture of refrigerant and oil in the counter-pressure space when applying a sealing washer fixed to one side of the first bearing.

FIG. 5 illustrates, in a schematic representation, the enrichment of oil from the mixture of refrigerant gas and oil in the counter-pressure space 12, more precisely in the cavity 12a of the second bearing 11 and of the balance weight 8, when applying a sealing washer 22 fixed to one side of the first bearing 10. As FIG. 5 shows, the sealing washer 22 is attached on one side in the way that it is fixed to the side of the first bearing 10 directed to the cavity of the balance weight 8 and of the second bearing 11. Thus, the ring-shaped sealing washer 22 for the oil 19 which is deposited in the cavity forms a barrier. In order to be able to overcome this sealing washer 22, the oil 19 gets enriched in the cavity of the balance weight 8 and of the second bearing 11, as represented in FIG. 5. The setting oil level 19b is determined by the inner diameter of the sealing washer 22. The sealing washer 22 has an inner diameter which corresponds to a radial oil level 19b which sets due to the barrier effect through application of the sealing washer 22 and whose horizontally oriented plane in the second bearing 11 lies between the outer ring 11a of the second bearing 11 and the inner ring 11b, i. e. in the region of the rolling elements 11c of the second bearing 11 formed in the shape of balls. The oil level 19b of the oil 19 collected due to the separation from the mixture of refrigerant gas and oil as a result of the centrifugal force in the rotating flow which is caused by the rotating balance weight 8 and additionally enriched due to the barrier effect of the ring-shaped sealing washer 22 is thus sufficient in order to fill the counterpressure space 12, in particular the cavity 12a of the balance weight 8 and of the second bearing 11, with oil 19 such that the outer ring 11a of the second bearing 11 is covered with oil 19 or even immersed in oil 19 such that a sufficient lubrication of the second bearing 11 is guaranteed for all operating states.

Figure 6A:
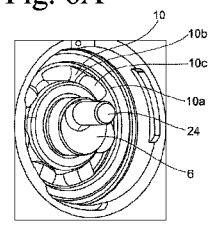
FIG. 6A: a perspective representation of a first bearing.
Figure 6B:
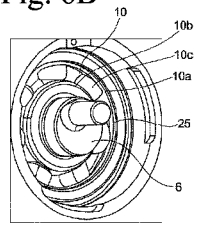
FIG. 6B: a perspective representation of the first bearing with a circumferential groove on the outer ring of the bearing.

The figures FIG. 6A and FIG. 6B serve for the illustration of a particular advantageous embodiment of the invention without showing the complete invention. Both figures show a perspective view of a conventional ball bearing which is used as the first bearing 10 for supporting the drive shaft 6 on the compressor housing 2. As with every rolling bearing, in the case of this ball bearing 10 as well, rolling elements 10c, here in the shape of balls 10c, are distributed between an inner ring 10b and an outer ring 10a over the entire circumference of the ball bearing 10 in order to reduce friction resistance. The drive shaft 6 has an eccentrically shifted connecting pin 24 for the eccentric drive of the second bearing which is molded to, inserted into or fixed to its end face. This connecting pin 24 serves for the connection of the drive shaft 6 to the balance weight, not represented, wherein a longitudinal axis corresponds to the axis of the movable scroll which is not represented either.

FIG. 6B shows a ball bearing 10 which is modified according to an advantageous embodiment of the invention, wherein a circumferential groove 25 which serves for the fixation of a ring-shaped sealing washer, not represented, to the first bearing 10, is formed in the outer ring 10a.

Figure 7:
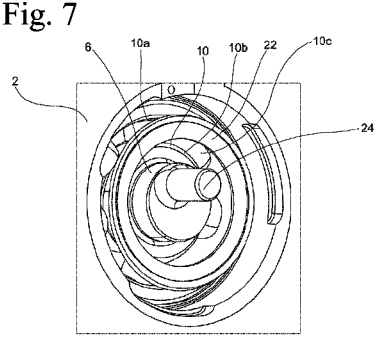
FIG. 7: a perspective representation of the drive shaft integrated into the compressor housing and supported on the first bearing and of a sealing washer before the fixation to the first bearing.

FIG. 7 shows a perspective representation of the drive shaft 6 with the connecting pin 24 integrated into the compressor housing 2 and supported on the first bearing 10 and a sealing washer 22 before its fixation to the first bearing 10. This view shows the first bearing 10 as a ball bearing 10 with the inner ring 10b, the outer ring 10a and the balls as rolling element 10c. A circumferential groove 25 for the sealing washer 22, which is still inserted, is formed on the outer ring 10a. FIG. 7 shows the part of the compressor housing 2 which provides the counter-pressure space with a cavity for the balance weight, not represented, and the second bearing, wherein these parts are not represented in FIG. 7.

Figure 8:
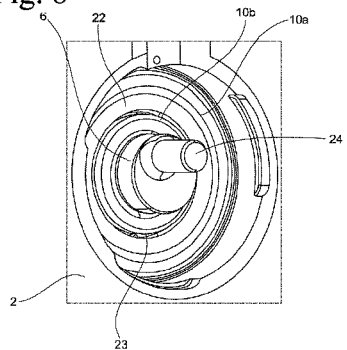
FIG. 8: a perspective representation of the drive shaft integrated into the compressor housing and supported on the first bearing with the sealing washer fixed to the first bearing.

FIG. 8 also shows the perspective representation of the drive shaft 6 with the connecting pin 24 integrated into the compressor housing 2 and supported on the first bearing 10. In contrast to the representation in FIG. 7, the sealing washer is fixed to one side of the outer ring 10a of the first bearing 10. The sealing washer 22 thus applied to the first bearing 10 is, at the same time, spaced from the inner ring 10b of the first bearing 10 in a radial manner such that a ring-shaped gap 23 between the sealing washer 22 and the inner ring 10b remains uncovered such that the fluid of refrigerant gas and oil can still flow through the first bearing 10.

Figure 9:
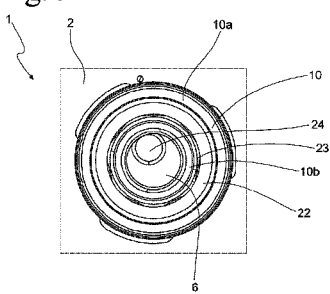
FIG. 9: a cross-sectional representation of the scroll compressor in a plane of the sealing washer fixed to the first bearing.

FIG. 9 shows a cross-sectional representation of the scroll compressor 1 in the plane of the sealing washer 22 fixed to the first bearing 10, wherein in this cross-section, apart from the sealing washer 22, the compressor housing, the first bearing 10 with the outer ring 10a and the inner ring 10b, the drive shaft 6 and the connecting pin 24 are visible. In doing so, the sealing washer 22 seals the first bearing 10 on one side in a radially outer part of the region between the outer ring 10a and the inner ring 10b of the first bearing 10 through which fluid can flow by fixing the sealing washer 22 on the outer ring 10a, and is, at the same time, spaced from the inner ring 10b in a radial manner such that a ring shaped gap 23 through which fluid can flow remains.

LIST OF REFERENCE NUMERALS

1 Scroll compressor
2 Compressor housing

3 Stationary scroll
3a Base plate
3b Wall of the stationary scroll
4 Movable scroll
4a Base plate
4b Wall of the movable scroll
5 Compression chambers
6 Drive shaft
7 Axis of rotation
8 Balance weight
9 Axis of the movable scroll
10 First bearing, ball bearing
10a Outer ring of the first bearing
10b Inner ring of the first bearing
10c Rolling element, balls of the first bearing
11 Second bearing
11a Outer ring of the second bearing
11b Inner ring of the second bearing
11c Rolling element, balls of the first bearing
12 Counter-pressure space
12a Cavity of the second bearing and of the balance weight
13 Guiding device
14 Pocket-shaped receipts, orbitating pockets
15 Pins
16 Wall of the compressor housing
17 Control mass flow
18 Low pressure side
19 Oil, oil layer, oil phase
19a Oil level (without sealing washer)
19b Oil level (with sealing washer)
20 Fluid inlet into the counter-pressure region
21 Fluid outlet out of the counter-pressure space
22 Sealing washer
23 Ring gap
24 Connecting pin
25 Circumferential groove

The invention claimed is:

1. A scroll compressor for compressing a refrigerant, comprising:
a compressor housing and two scrolls nested within the compressor housing with a respective base plate and a scroll-shaped wall extending from a front of the base plate, wherein a first one of the scrolls is fixed in a stationary manner and a second one of the scrolls is movable in an eccentric manner on a circular path and by moving the second one of the scrolls, a volume of compressor chambers formed between the scrolls can be changed in a cyclical manner;
an eccentric drive by means of which the second one of the scrolls can be moved on a circular path, which comprises a drive shaft rotatable about an axis of rotation and a balance weight rotatable with the drive shaft and via which the second one of the scrolls is connected to the drive shaft in an eccentric manner;
a first bearing via which the drive shaft is supported on the compressor housing, and a second bearing via which the second one of the scrolls is supported on the balance weight; and
a counter-pressure space within the compressor housing on a back of the base plate of the second one of the scrolls, in which a cavity of the balance weight and of the second bearing is formed, wherein a sealing washer is fixed on the first bearing at a side of the first bearing directed to the cavity of the balance weight and of the second bearing such that the sealing washer seals the first bearing on one side in a radially outer part of a region between an outer ring and an inner ring of the first bearing through which fluid can flow and is spaced from the inner ring of the first bearing in a radial manner such that a gap through which fluid can flow remains, wherein during the operation of the scroll compressor, a fluid mixture of refrigerant gas and oil is introduced into the counter-pressure space and the oil separates from the fluid mixture due to a centrifugal force which occurs in a flow of the mixture of refrigerant gas and oil caused by the balance weight, wherein the sealing washer acts as a barrier up to a setting of a radial oil level which is sufficient for lubrication of the second bearing in the cavity of the balance weight and of the second bearing, wherein the sealing washer is ring shaped with an inner diameter which corresponds to the radial oil level which sets due to a barrier effect of the sealing washer, and wherein a first axis extending in an axial direction of each of the first bearing and the second bearing is always arranged along the inner diameter of the sealing washer while passing between the outer ring and the inner ring of the second bearing with respect to at least one position along the second bearing in a circumferential direction thereof to result in the radial oil level passing between the outer ring and the inner ring of the second bearing along the first axis for lubricating the second bearing via the entry of the oil between the outer ring and the inner ring of the second bearing.

2. The scroll compressor according to claim 1, wherein the sealing washer is fixed on the outer ring of the first bearing.

3. The scroll compressor according to claim 1, wherein the sealing washer is fixed on the outer ring of the first bearing via a clamping connection.

4. The scroll compressor according to claim 1, wherein the sealing washer and the gap are formed in a ring-shaped manner.

5. The scroll compressor according to claim 1, wherein the first bearing is a rolling bearing or a ball bearing, with the outer ring and the inner ring and rolling elements distributed therebetween over an entire circumference.

6. The scroll compressor according to claim 5, wherein a circumferential groove for fixing the sealing washer is formed for receipt of the sealing washer on an inner wall of the outer ring of the first bearing.

7. The scroll compressor according to claim 1, wherein the second bearing is a rolling bearing or a ball bearing, with the outer ring and the inner ring and rolling elements distributed therebetween over an entire circumference.

8. The scroll compressor according to claim 1, wherein the first axis arranged along the inner diameter, which corresponds to the radial oil level at the at least one position along the second bearing with respect to the circumferential direction thereof, lies closer to the inner ring than to the outer ring of the second bearing.

9. The scroll compressor according to claim 1, wherein the inner diameter of the sealing washer is disposed radially between a radially innermost surface of the outer ring of the first bearing and a radially outermost surface of the inner ring of the first bearing.

10. The scroll compressor according to claim 1, wherein the gap through which fluid can flow is formed radially between the inner diameter of the sealing washer and a radially outermost surface of the inner ring of the first bearing.

* * * * *